US010677303B2

(12) United States Patent
Berwanger

(10) Patent No.: US 10,677,303 B2
(45) Date of Patent: Jun. 9, 2020

(54) DISC BRAKE WEAR ADJUSTER

(71) Applicant: Bendix Spicer Foundation Brake LLC, Elyria, OH (US)

(72) Inventor: Fred W. Berwanger, Edwardsburg, MI (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 60 days.

(21) Appl. No.: 15/889,422

(22) Filed: Feb. 6, 2018

(65) Prior Publication Data

US 2019/0242449 A1   Aug. 8, 2019

(51) Int. Cl.
| | |
|---|---|
| *F16D 65/38* | (2006.01) |
| *F16D 65/56* | (2006.01) |
| *F16D 55/227* | (2006.01) |
| *F16D 65/18* | (2006.01) |
| *F16D 121/16* | (2012.01) |
| *F16D 125/32* | (2012.01) |
| *F16D 125/42* | (2012.01) |
| *F16D 125/70* | (2012.01) |
| *F16D 121/14* | (2012.01) |

(52) U.S. Cl.
CPC ......... *F16D 65/568* (2013.01); *F16D 55/227* (2013.01); *F16D 65/56* (2013.01); *F16D 65/567* (2013.01); *F16D 65/183* (2013.01); *F16D 2121/14* (2013.01); *F16D 2121/16* (2013.01); *F16D 2125/32* (2013.01); *F16D 2125/42* (2013.01); *F16D 2125/70* (2013.01)

(58) Field of Classification Search
CPC ....... F16D 65/56; F16D 65/567; F16D 65/568
See application file for complete search history.

(56) References Cited

U.S. PATENT DOCUMENTS 3,837,437 A * 9/1974 Martins ................... F16D 65/28
                                                             188/71.8
4,301,897 A * 11/1981 Cox, Jr. .................. F16D 65/56
                                                             188/196 BA (Continued)

FOREIGN PATENT DOCUMENTS

| DE | 43 07 017 A1 | 12/1993 |
|---|---|---|
| GB | 1 303 127 A | 1/1973 |
| JP | 11-22764 A | 1/1999 |

OTHER PUBLICATIONS

Extended European Search Report issued in counterpart European Application No. 19154666.2 dated Aug. 14, 2019 (11 pages).

*Primary Examiner* — Nicholas J Lane
(74) *Attorney, Agent, or Firm* — Crowell & Moring LLP

(57) ABSTRACT

A disc brake, a wear adjuster for a disc brake and a method for operating a disc brake are provided. The wear adjuster includes a pawl biased by a spring against, and actuated by, a rotary lever, a shaft with the ratchet wheel arranged to be rotated by the pawl when the rotary lever rotates in a brake release direction, and a tappet wheel threaded on a brake application tappet supported on a movable bridge in the disc brake caliper. During brake release the pawl rotates the ratchet wheel and the shaft. The shaft and the tappet wheel have gearing which rotates the tappet wheel with the shaft. Due to the threaded engagement of the tappet wheel and the non-rotating tappet, the rotating tappet wheel causes the tappet to advance relative to the bridge to compensate for brake pad wear.

19 Claims, 6 Drawing Sheets

(56) References Cited

U.S. PATENT DOCUMENTS

| | | | | |
|---|---|---|---|---|
| 4,382,491 | A * | 5/1983 | Chun | F16D 55/22655 |
| | | | | 188/196 P |
| 4,598,801 | A * | 7/1986 | Villata | F16D 65/567 |
| | | | | 188/196 BA |
| 6,354,407 | B1 * | 3/2002 | Heinlein | F16D 65/18 |
| | | | | 188/71.1 |
| 6,705,435 | B2 | 3/2004 | Severinsson | |
| 6,899,204 | B2 * | 5/2005 | Baumgartner | F16D 55/22 |
| | | | | 188/71.9 |
| 6,955,246 | B2 | 10/2005 | Norman et al. | |
| 2017/0292576 | A1 | 10/2017 | Henning et al. | |
| 2018/0298962 | A1 * | 10/2018 | Yoshikawa | F16D 65/02 |

* cited by examiner

DISC BRAKE WEAR ADJUSTER

BACKGROUND AND SUMMARY OF THE INVENTION

The present invention relates to disc brakes for vehicles, and in particular to a system and method for compensating for wear between a brake disc and brake pads in disc brakes such as air-operated disc brakes utilized on commercial vehicles.

In pneumatically-actuated disc brakes (also known as "air disc brakes" or "ADB"), such those used in commercial vehicle applications, a pneumatic actuator supplied with compressed air from the vehicle fastened to an inboard side of the brake caliper has a pushrod which contacts a pivoting brake actuating lever inside of the caliper.

An example of such a brake is shown in FIG. 1. In this cross-section view, a pneumatic brake actuator 12 includes a service brake section 11 fastened to the housing 2a of a brake caliper 3. The service brake section includes a diaphragm-driven rod 10, the end of which is received in a socket of the rotary brake actuation lever 9 of the brake caliper's brake actuation mechanism. The lower portion 8 of the rotary lever 9 is located in eccentric bearing arrangement, arranged so that as the lever 9 rotates (guided by bearing 7 at a rear portion of the caliper), the lever pivot 13 advances in the direction of the brake disc 1. As the pivot 13 advances, a brake actuation tappets 14 are advanced toward brake application side brake pad 19 into contact with the inboard friction surface of brake disc 1. Once in contact with the brake disc, backing 2b of the brake caliper 3 (which straddles the brake disc 1) slides parallel to the brake disc rotation axis to press the reaction side brake pad 20 into contact with the brake disc 1. Such sliding caliper brakes are axially displaceable on guides, such as the guide sleeve 6 and guide pin 4 arrangement in FIG. 2.

Commercial vehicle air disc brakes are often provided with two brake application tappets arranged in parallel, being carried by a "bridge" block 17 that is centrally driven by the rotary lever 9. In addition, they may be provided with devices such as a return spring 15 intended to ensure that the brake pads are not being biased against the brake disc by the brake application tappets when the brake is not being applied.

Typically, such ADB brake actuation mechanisms incorporate wear adjusters designed to compensate for thinning of the brake pad friction material as the brake pads wear. The wear adjusters are configured to incrementally advance the brake actuation tappets toward the brake disc as needed to help maintain a consistent desired "air gap" between the brake disc and the brake pads when the brake is not applied. Maintaining a desired air gap helps ensure the brake pads will consistently quickly engage the brake disc when the brake is applied, and to ensure that the point at which the brake pads contact the brake disc during brake application will continue to occur before the rotary lever 9 reaches its end of travel (the end-of-travel position is illustrated in FIG. 1 by the interrupted outline of rotary lever 9).

Air disc brake wear adjusters have traditionally been complicated arrangements, due to the need to synchronize the adjustment movements of both brake application tappets, and the need to provide a readily accessible and reliable way to allow the brake application tappets to be backed out away from the brake disc, for example during brake service in which the brake pads are to be replaced (i.e., when the wear adjusters are near the end of their available travel). The wear adjuster mechanism in FIG. 2 includes spindles 24 which engage internally fluted tappets 14. As the spindles are rotated, the tappets are axially advanced toward the brake disc 1. In this known embodiment, the wear adjuster spindles are connected by sprockets 32 and a chain 30 to one another for adjuster synchronization and to a mechanical adjustment device. In this wear adjustment example, one of the wear adjuster spindles 24 is provided with a rear extension 61 which protrudes through the rear wall of the caliper body 2. After removal of an environment exclusion cap 37, a technician may manually rotate the spindle in a brake release direction to cause the spindles (synchronized via chain 30) to withdraw the brake application tappets 14 away from the brake disc to provide enough space for insertion of new brake pads.

The prior wear adjustment arrangements are complicated and costly. These and other problems are addressed by the present invention, which provides a simpler and lower-cost approach to compensating for brake pad wear in such brakes. In the present invention wear adjustment is provided by incorporation into the bridge of tandem automatic adjustment worm drives.

Worm gear sets have the advantages of providing high mechanical advantage in a compact space, and being designable to be "back-drive proof" (i.e., inhibiting undesired reverse rotation) by controlling the lead angle and the pressure angle of the worm threads and the coefficient of friction of the worm drive materials.

In one embodiment of the present invention's simpler and less-costly arrangements, there is provided a worm shaft with a ratchet gear arranged on the bridge with worm gear threads in the regions at or near the opposing ends of the worm shaft. The two sets of worm threads engage corresponding external teeth of the worm wheels (also referred to herein as brake application tappet wheels) such that rotation of the worm shaft results in the two brake application tappets advancing or retracting the tappets simultaneously. The threads may be all right- or left-handed, eliminating the need for separate left and right tappet designs. Alternatively, the threads on each side may be opposite-handed to cancel out each other's axial load in the shaft. The thread form may be trapezoidal.

Preferably, the worm shaft extends laterally across the bridge approximately perpendicular to the axes of rotation of the brake application tappets and parallel to the rotation axis of the rotary lever. Alternative orientations include the worm shaft being located diagonally in the bridge, such that the worm at one end of the shaft engages the teeth of one worm wheel on an upper side of the tappet, and the worm at the other end of the shaft engages the teeth of the other worm wheel on a lower side of the other tappet. The worm shaft may be located on an outer surface of the bridge, or may be located within the bridge, for example, captured by a cover plate of a two-piece bridge.

Alternatively, the ends of the shaft may incorporate any motion transfer arrangement that causes the brake application tappets to advance when the shaft is rotated, such as bevel gears that engage corresponding bevel gear teeth of the brake application tappets.

The rotation of the worm shaft is driven by the ratchet wheel (either attached to, or integrally formed with, the worm shaft). The ratchet wheel in turn is driven on the brake release stroke of the rotary lever. Preferably, the ratchet wheel is driven to rotate by a pawl provided tangentially to the ratchet wheel, between a brake disc-facing side of the rotary lever and the bridge. The pawl may be biased by a spring having a first end supported on the bridge. A second end of the spring is arranged to bias the pawl against the ratchet gear teeth. The spring may be, for example, linear, or torsional and concentric with the shaft. When the brake is released, the energy stored in the spring by the advancing rotary lever during the brake application stroke returns the pawl to its rest position as the rotary lever retracts.

The pawl is configured to ride over the unidirectional teeth of the ratchet wheel as the rotary lever advances in the brake application direction. Conversely, when the rotary lever moves in the brake release direction and a wear adjustment is needed to reduce the resting gap between the brake pads and the brake disc, a tooth on the pawl may engage a tooth on the ratchet wheel to cause the ratchet wheel to rotate. The rotation of the ratchet wheel causes the worm shaft to rotate. The rotation of the shaft's worms rotates a worm wheel positioned in the bridge around each brake application tappet present. Each worm wheel has internal threads which engage corresponding external threads of its respective tappet. Preferably the tappets are held against rotation while being supported on the bridge, so that when the tappet worm wheels are rotated, their internal threads drive the tappet external threads to axially advance the tappets toward the brake disc, thereby adjusting the lengths of the brake application tappets relative to the bridge to compensate for brake pad wear.

The amount of relative motion between the pawl and the ratchet gear in both the brake application and brake release directions is relatively small, and only occurs when brake adjustment is needed. Accordingly, the pawl teeth, ratchet wheel teeth, worm threads, and tappet threads may be sized such that the motion of the pawl in the brake release direction provides a desired amount of brake pad-to-brake disc gap reduction to compensate for brake pad wear, without the need for additional intermediate reduction gearing.

In a particularly preferred embodiment, the ratchet wheel is located at least partially in a slot in the bridge that is perpendicular to the rotation axis of the worm shaft. The slot is preferably axially wider than that the ratchet wheel, and includes a lateral contact surface configured to abut a corresponding surface of the ratchet wheel. With such a configuration, the ratchet wheel may be biased against the slot contact surface when the worn brake is applied so that friction inhibits undesired reverse rotation of the shaft (for example undesired reverse rotation resulting from vibrations experienced by the brake during road use). Then, during the release of the brake from a brake-applied state, the shaft is axially displaced by the axial force generated by interaction of the gears at the end of the shaft with their corresponding tappet worm wheels, thereby moving the ratchet wheel axially off of the slot contact surface to permit free rotation of the ratchet wheel in response to pawl engagement.

During brake application, the axial loading on the tappet causes friction between the threads of the tappets and the threads of their worm wheels to effectively lock the worm wheels against rotation in the bridge. With the worm gears unable to rotate, the shaft and the ratchet wheel accordingly are prevented from rotating, eliminating the potential for these components to rotate in an unwanted manner in response to stimuli such as vibrations during a brake application event. Further, during periods in which the brake is at rest (i.e., not applied), the pawl tooth that previously actuated the ratchet wheel remains in a position that prevents the ratchet wheel from rotating and altering the desired adjusted position of the tappets.

The brake components (e.g., pawl, rotary lever, bridge) are configured such that brake pad wear adjustments are only made when the rotary lever over-extends, i.e., passes a predetermined desired maximum rotary lever displacement due to brake wear.

In a further embodiment, at least one end of the shaft incorporates a wrenching feature (for example, a hex-shape) for manual adjustment of the brake during maintenance, for example for manual retraction of the brake application tappets to allow insertion of new brake pads and to reset the adjustment mechanism. The wrenching feature may be accessible via a normally-capped opening in the brake caliper housing. During such an adjustment, the pawl may be retracted so as not to engage the ratchet gear teeth.

The present invention provides multiple advantages by combining the functions of brake adjustment, adjustment locking, and tappet synchronization into one worm-geared shaft, which also reducing component complexity and costs.

Other objects, advantages and novel features of the present invention will become apparent from the following detailed description of the invention when considered in conjunction with the accompanying drawings.

DETAILED DESCRIPTION OF THE DRAWINGS

Figure 1:
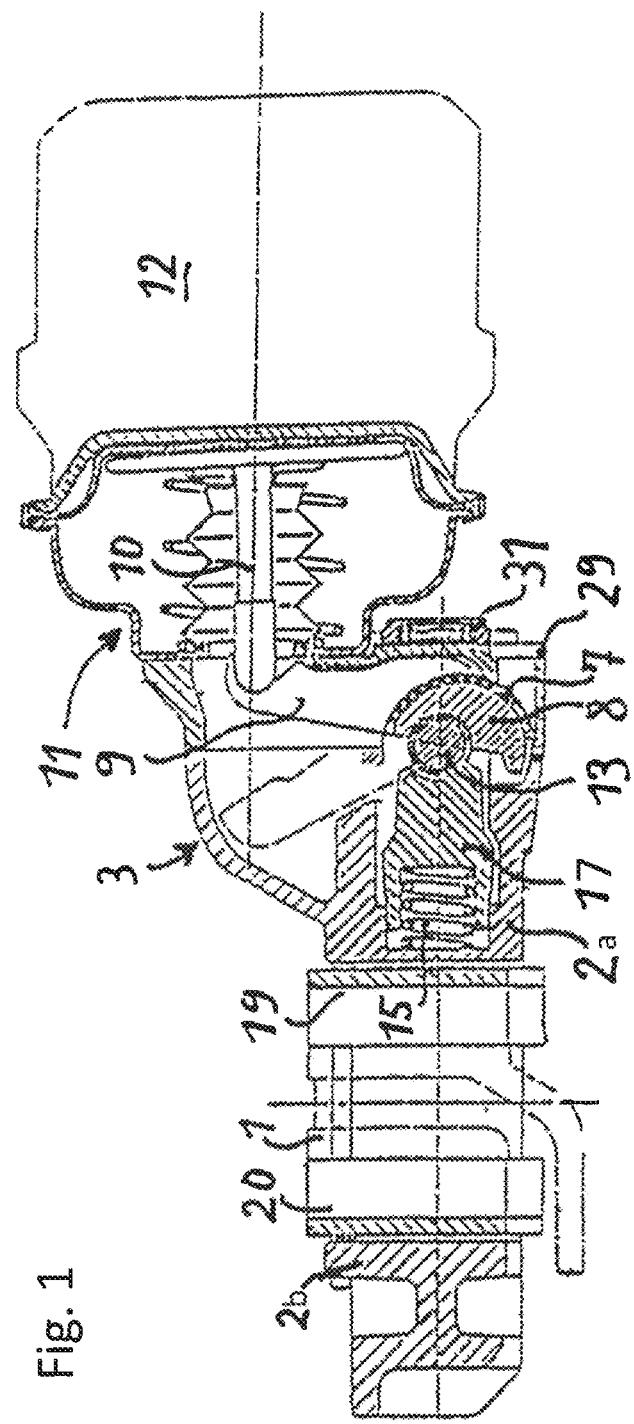
FIG. 1 is an illustration of a prior art brake caliper having a conventional rotary lever brake actuation mechanism
Figure 2:
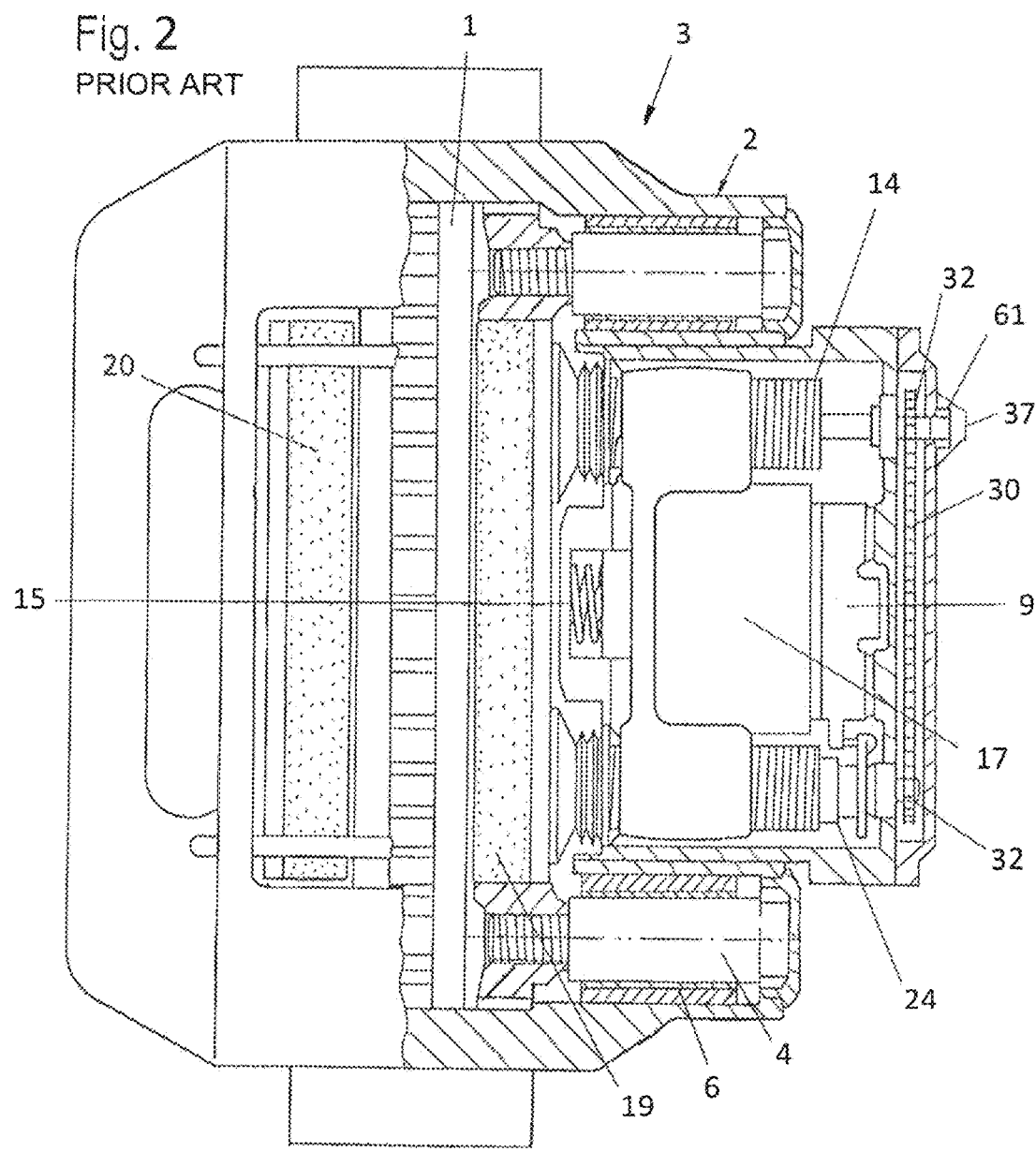
FIG. 2 is a plan view of a prior art rotary lever disc brake in accordance with an embodiment of the present invention.

The reference label numbering in FIGS. 3-6B does not correspond to the numbering in prior art FIGS. 1 and 2. Common reference label numbers are used with common features in FIGS. 3-6B. Some components of the brake caliper not necessary for an understanding of the present invention are not included in FIGS. 3-6A to permit more clear illustration of the novel features of the present invention.

Figure 3A:
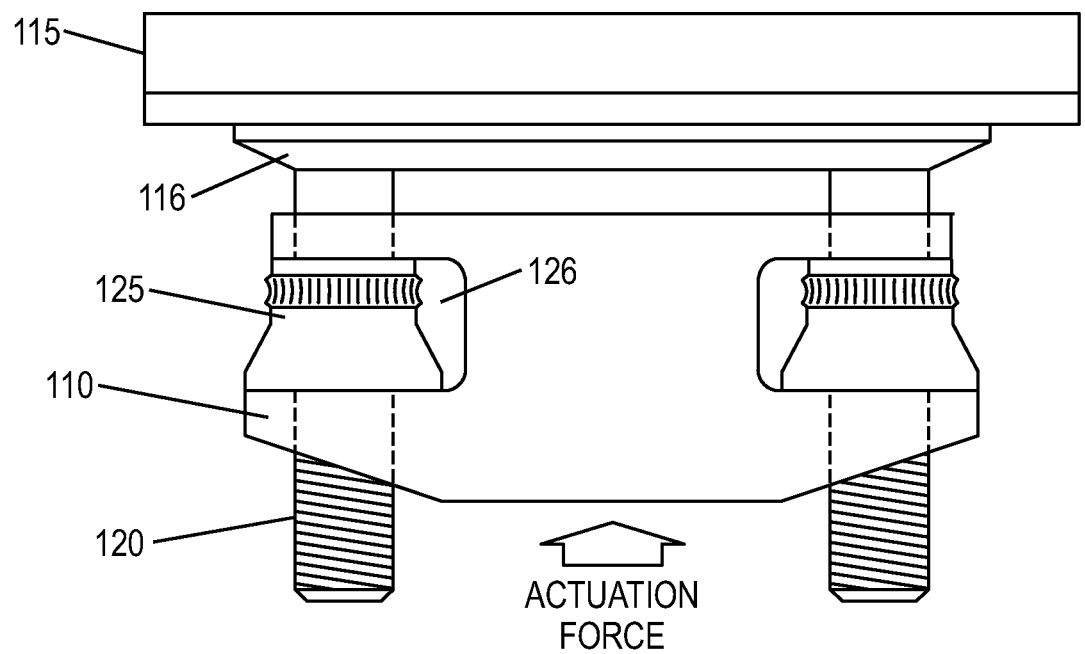
FIGS. 3A and 3B are top views of brake application and adjustment components in accordance with an embodiment of the present invention.

FIG. 3A schematically illustrates a plan view of an embodiment of a bridge with a wear adjuster shaft in accordance with the present invention. In this embodiment, a bridge 110 carries two parallel tappets 120. The tappets 120 have external threads which engage internal threads of worm wheels 125 located in apertures 126 in the bridge 110. In FIG. 3A the brake pad ends of the tappets 120 engage a tappet connector plate 116 which holds the ends of the tappets 120 such that they cannot rotate relative to the bridge, and further assists in distributing the applied brake actuation force load more evenly across the backing plate of brake pad 115. Because the worm wheels 125 are constrained from axial movement by the front and rear sides of their respective bridge apertures 126, and further because the tappets 120 are held in a non-rotating manner, when the worm wheels 125 are rotated their internal threads drive the external threads of the tappets 120 axially toward the brake disc during wear adjustment.

Figure 3B:
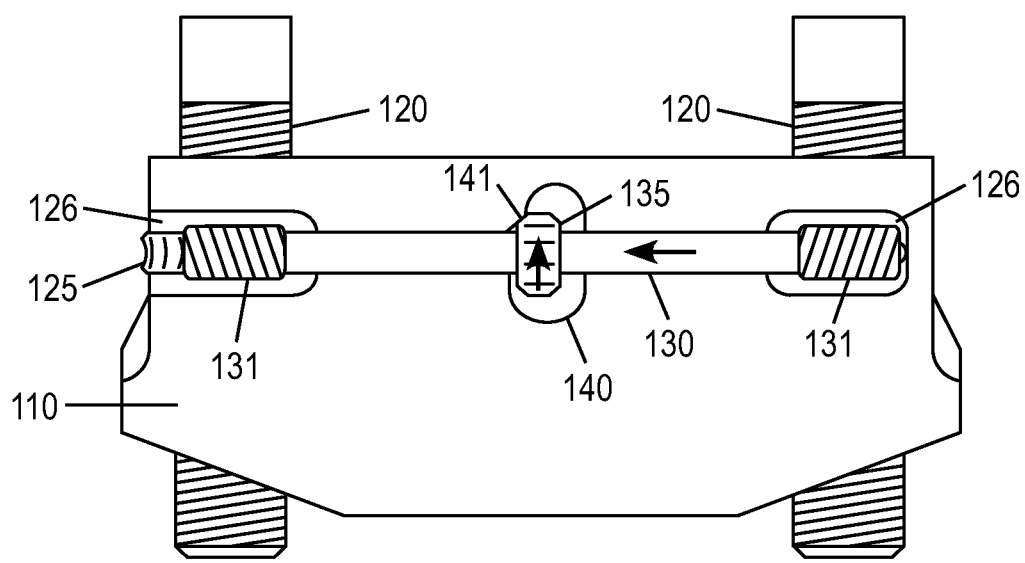

FIG. 3B schematically illustrates the bridge 110 with a worm shaft 130 carried thereon and arranged to receive, and constrain the axial motion of, the worm wheels 125 in apertures 126. The worm shaft in this embodiment includes at its opposite ends worm screws 131 configured to mesh with the teeth of the worm wheels 125. The worm shaft 130 also includes a ratchet wheel 135 (also visible in the FIG. 4 elevation view). The ratchet wheel 135 is non-rotationally located on the worm shaft. When the ratchet wheel 135 is rotated, the worm shaft 130 rotates, causing the worm screws 131 to rotate the tappet worm wheels 125. The rotation of the worm wheels 125 in turn advances (or retracts, depending on rotation direction) the tappets 120 relative to the bridge 110.

FIG. 3B also shows an embodiment of an arrangement which, in a mechanically simple manner, inhibits undesired rotation of the ratchet wheel 135 yet allows the ratchet wheel 135 to rotate freely when driven in the brake pad air gap reduction direction. In this arrangement the ratchet wheel 135 is positioned partially in a slot 140. A contact surface 141 is provided at one side of the slot 140. The slot contact surface 141 is configured to frictionally interact with a corresponding surface on the ratchet wheel 135 when the shaft 130 is axially displaced.

When the ratchet gear 135 is driven to rotate during a brake release event in which a wear adjustment occurs (the driving of the ratchet wheel is further discussed below), the ratchet wheel 135 disengages from the slot contact surface 141. The initial rotation of the ratchet wheel 135 (and hence the shaft 130 and worm screw 131) during the brake release event causes the shaft and ratchet wheel to be axially displaced away from the slot contact surface 141. The axial forces are generated by the combination of the non-rotation of the worm wheels 125 when under load (the interaction of the tappet 120 external threads and the worm wheels 125 internal threads "frictionally locking" the worm wheels 125 against rotation when a brake application load is being applied), and the interaction of the worm wheel teeth with the worm screws 131. During initial movement of the ratchet wheel 135 and shaft 130 as the pawl 220 begins to rotate the ratchet wheel 135, the shaft's rotation causes the worm teeth at shaft ends 131 to press against the non-rotating tappet worm wheel external threads. This results in the worm pushing the shaft ends 131 (and hence, the shaft 130 and ratchet wheel 135) axially in a direction that displaces the ratchet wheel 135 away from its frictional engagement with the slot contact surface 141, and thereby releases the ratchet wheel to freely rotate in response to being driven in the wear adjustment direction.

As the brake release event proceeds, the axial loading on the tappets 120 decreases, allowing the worm wheels 125 to be able to rotate in the slots 126 of the bridge 110. As the tappets become able to rotate and the ratchet wheel 135 continues to be driven in the wear adjustment direction by the pawl 220 (see FIG. 4; omitted in FIGS. 3A, 3B for clarity), the worm screws 131 to begin to rotate the tappet worm wheels 125, thereby advancing the tappets 120 relative to the bridge 110 to reduce the gap between the brake pads and the brake disc.

Figure 4:
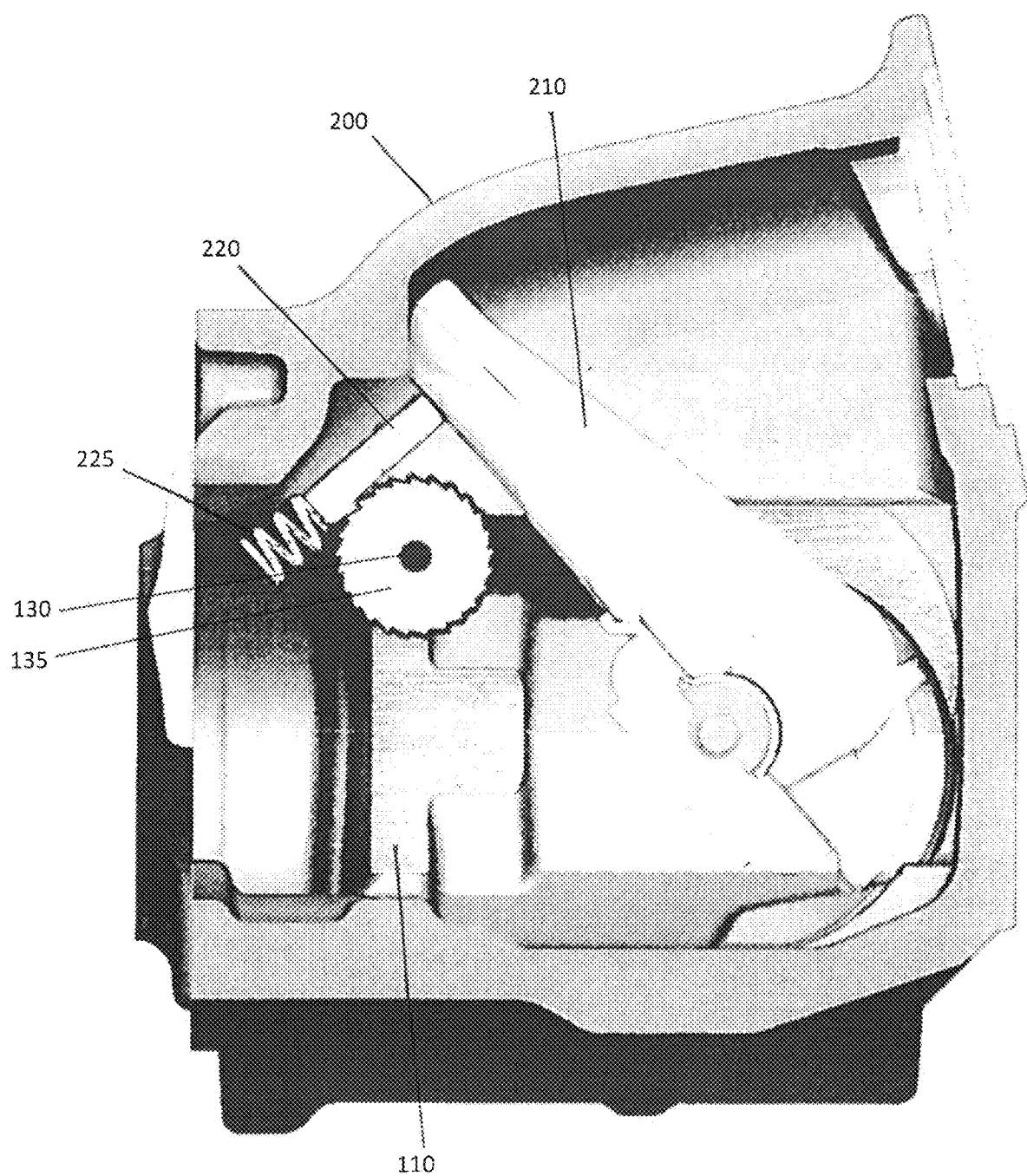
FIG. 4 is a cut-away view of a brake caliper housing with brake adjustment components in accordance with an embodiment of the present invention.

FIG. 4 shows a schematic illustration of an arrangement for driving the ratchet wheel 135 in the wear adjustment direction during a brake release event. This figure shows a view from the side through approximately the center of the brake caliper housing 200. In this view, the rotary lever 210 is fully-advanced in the brake application direction by the brake actuator pushrod (not shown). As the rotary lever 210 is advanced in the brake application direction from its brake release position at the rear of the housing 200, the lever pushes the ratchet pawl 220 against the restoring force of a spring 225. Because the teeth of the ratchet wheel 135 are unidirectional in a direction that does not allow engagement of a corresponding tooth on the pawl 220 during brake application, the pawl slides over the ratchet wheel without driving rotation. The non-rotation of the ratchet wheel 135 here is also aided by the friction interaction between the contact surface 141 and the ratchet wheel.

In this embodiment, the pawl 220 is located and sized such that its tooth does not pass over the ratchet wheel teeth until the rotary lever 200 is nearly fully advanced, which corresponds to a maximum desired brake pad wear state beyond adjustment of the gap between the brake pads and the brake disc is needed.

In FIG. 4, the rotary lever 200 has advanced far enough during the brake application stroke to advance the pawl 210 over the ratchet wheel 135. When the brake is released, the actuator pushrod withdraws and the rotary lever 210 begins to rotate back to its brake release position. The energy stored in the spring 225 by compression during the brake application stroke is now returned to the pawl 220 as a restoring force returning the pawl 220 to its rest position. As the pawl 220 extends, a pawl tooth engages one of the unidirectional teeth of the ratchet wheel 135, causing the ratchet wheel to rotate by a determined amount corresponding to a desired amount of tappet extension to set the desired pad-to-disc gap. The rotary motion of the ratchet wheel 135 is transferred via shaft 130 to the worm wheels 125 to axially displace the tappets 120 relative to the bridge 110 in the manner discussed above.

In the preceding embodiment the ratchet wheel 135 and the pawl 220 are located approximately centered in the brake housing, aligned with the center of the worm shaft 130 and the bridge 110. The present invention is not limited to this ratchet wheel and pawl arrangement. For example, the ratchet wheel and/or the pawl may be laterally offset from the rotary lever, for example, to place these components in a region of the housing where they do not interfere with other brake features. In such an embodiment, an intervening linkage extending between the rotary lever and the ratchet wheel and/or the pawl would serve to transfer motion between these components.

FIGS. 5A-5B and 6A-6B schematically show other alternative embodiments of the arrangements for transferring motion from the shaft 130 to the tappets 120.

Figure 5A:
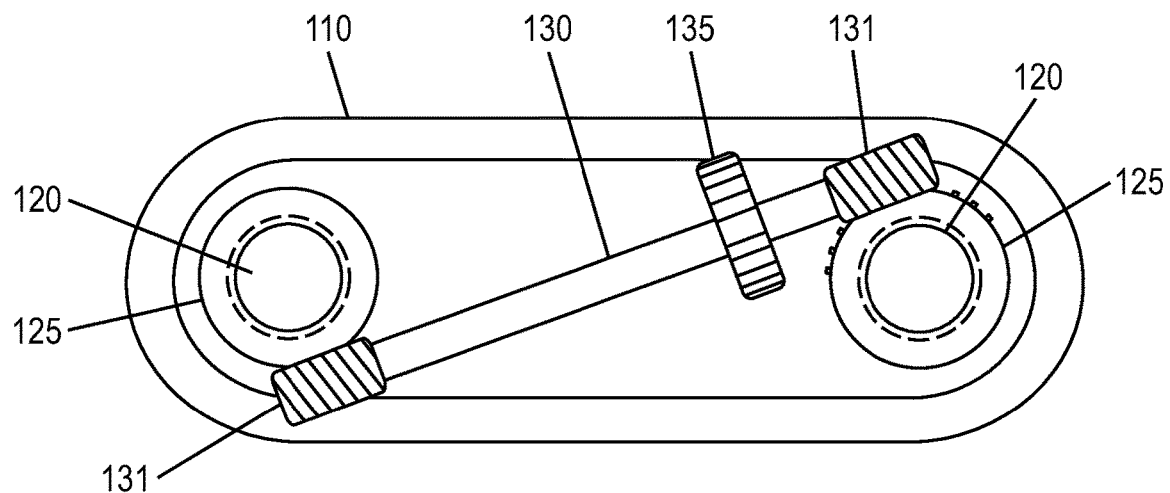
FIGS. 5A and 5B are elevation views of alternative brake application and adjustment component arrangements in accordance with an embodiment of the present invention.

FIG. 5A shows an elevation view of an arrangement in which the shaft 130 is positioned diagonally in the bridge 110, such that the worm screws 131 at the shaft opposite ends engage the bottom of one worm wheel 125 and the top of the other worm wheel 125.

Figure 5B:
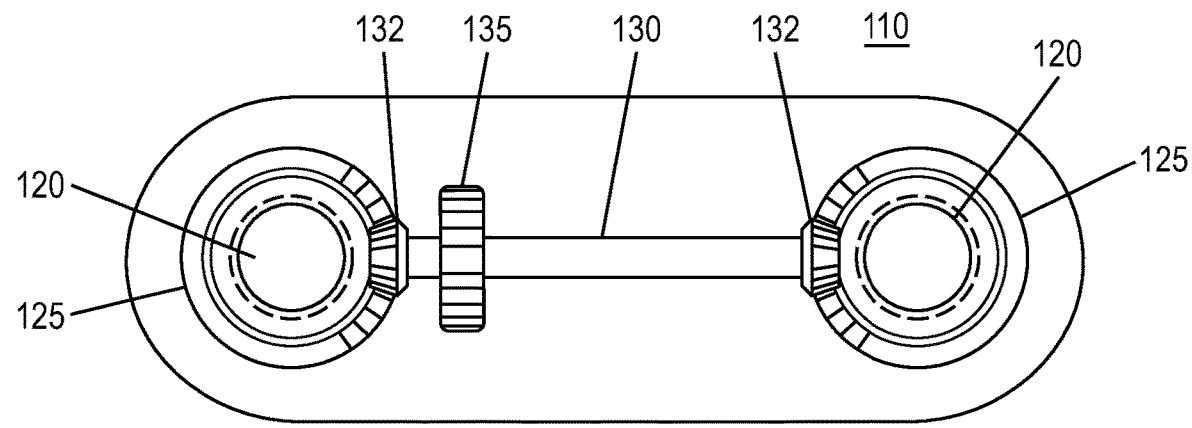

FIG. 5B shows an arrangement in which the worm screws 131 at the end of the shaft 130 and the worm wheels 125 are replaced by bevel gear teeth 132 and corresponding bevel teeth on the wheels 125. The use of bevel-gearing in this embodiment reduces the space required for the assembled components.

Figure 6A:
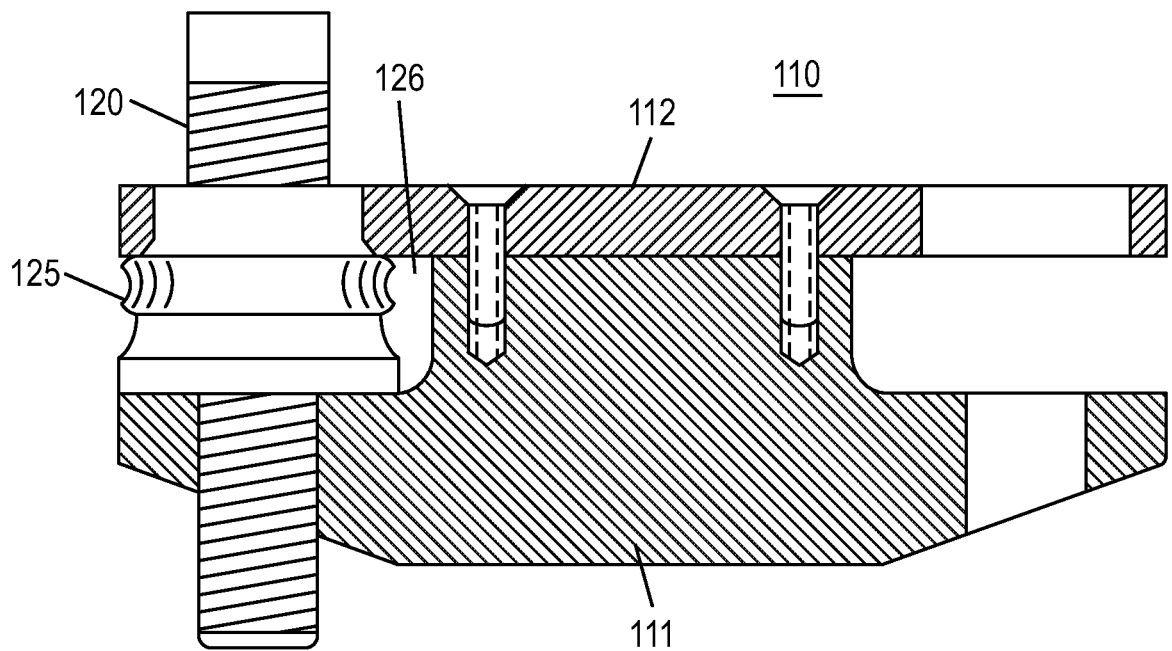
FIGS. 6A and 6B are views of another alternative brake application component arrangements in accordance with an embodiment of the present invention.
Figure 6B:
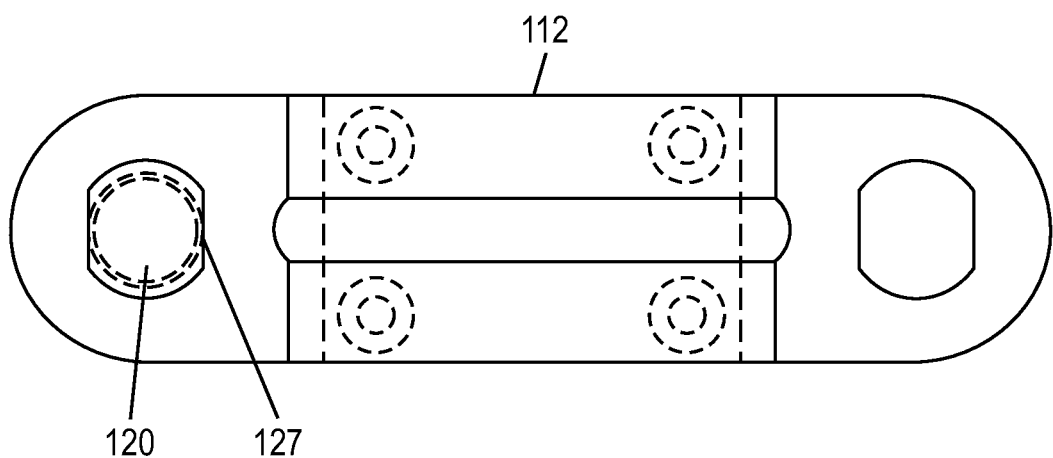

FIGS. 6A-6B show an embodiment in which the bridge 110 is formed from a bridge body 111 and a bridge connector plate 112. This embodiment places the structure that prevents rotation of the tappets 120 relative to the bridge 100 directly on the bridge, rather than the first embodiments' relying on the separate tappet connector plate 116. The bridge body 111 includes apertures 127 into which the inboard (brake actuator-side) ends of the tappets 120 are inserted. The apertures 127 have flat-sided portions configured to engage corresponding flats in the external threads of the tappets 120 to positively secure the tappets 120 against rotation relative to the bridge. The bridge connector plate 112 in this embodiment is secured to the bridge body 11 by four fasteners, however, any suitable structure for coupling the connector plate to the bridge body may be used as long as the structure inhibits tappet rotation while permitting the tappets 120 to move axially during wear adjustment events. FIG. 6A shows a tappet worm wheel 125 in an aperture 126 similar to the first embodiment. Preferably for cost and easy of assembly reasons, one wall of the aperture 126 is formed by the bridge connector plate 112 when the plate is mounted on the bridge body 111. The shaft 130, in this embodiment is located in another plane section above the FIG. 6A cross-section view, and is omitted from FIG. 6A for clarity.

The foregoing disclosure has been set forth merely to illustrate the invention and is not intended to be limiting. Because other such modifications of the disclosed embodiments incorporating the spirit and substance of the invention may occur to persons skilled in the art, the invention should be construed to include everything within the scope of the appended claims and equivalents thereof.

LISTING OF REFERENCE LABELS

1 disc brake
2*a* caliper housing
2*b* caliper backing
3 brake caliper
4 guide pin
5 inboard caliper portion
6 guide sleeve
7 bearing
8 rotary lever lower portion
9 rotary lever
10 brake actuator push rod
11 service brake section
12 brake actuator
13 lever pivot
14 brake actuation tappet
15 return spring
17 bridge
19 application side brake pad
20 reaction side brake pad
24 spindle
30 chain
32 chain sprocket
37 environment exclusion cap
61 spindle extension
110 bridge
111 bridge body
112 bridge connector plate
115 brake pad
116 tappet connector plate
120 tappet
125 worm wheel
126 bridge aperture
127 apertures
130 shaft
131 worm screw
132 bevel gear teeth
135 ratchet gear
140 slot
141 contact surface
200 caliper housing
210 rotary lever
220 pawl
225 spring

What is claimed is:

1. A disc brake, comprising:
   a brake caliper configured to straddle a brake disc, the brake caliper including
   a rotary lever;
   a bridge drivable by the rotary lever toward the brake disc when the rotary lever rotates in a brake application direction;
   a tappet supported on the bridge; and
   a wear adjuster including
   a tappet wheel rotatably arranged on the tappet,
   a shaft supported on the bridge and configured to rotate the tappet wheel,
   a ratchet wheel non-rotatably arranged on the shaft, and
   a pawl drivable by the rotary lever toward the brake disc when the rotary lever rotates in a brake application direction, the pawl having a pawl tooth configured to engage a tooth of the ratchet wheel,
   wherein
   the tappet wheel is configured to cooperate with the bridge to advance the tappet toward the brake disc when the rotary lever advances the bridge toward the brake disc,
   the pawl is arranged such that after the pawl tooth engages the ratchet wheel tooth during rotation of the rotary lever in the brake application direction, during rotation of the rotary lever in a brake release direction the pawl rotates the ratchet wheel and the shaft in a wear adjustment direction,
   the shaft is configured to drive the tappet wheel to advance the tappet toward the brake disc relative to the bridge when the shaft rotates in the wear adjustment direction.

2. The disc brake of claim 1, further comprising:
   a pawl spring arranged in the brake caliper to bias the pawl toward a brake disc side of the rotary lever,
   wherein
   during rotation of the rotary lever in the brake application direction the rotary lever displaces the pawl in a manner which compresses the pawl spring, and
   during rotation of the rotary lever in the brake release direction the pawl spring displaces the pawl in a manner which causes the pawl to follow the rotary lever.

3. The disc brake of claim 2, wherein
   the tappet and the tappet wheel are the first of at least two tappets with respective tappet wheels supported on the bridge parallel, and
   the shaft includes gear teeth configured to engage corresponding gear teeth of each of the tappet wheels.

4. The disc brake of claim 3, wherein
   the bridge includes a ratchet wheel aperture configured to receive at least a portion of the ratchet wheel when the shaft is in an installed position on the bridge.

5. The disc brake of claim 4, wherein
   the ratchet wheel aperture has a width parallel to a longitudinal axis of the shaft wider than a width of the ratchet wheel along the shaft longitudinal axis, and
   the ratchet wheel aperture includes a ratchet wheel contact surface configured to inhibit rotation of the ratchet wheel when the ratchet wheel is displaced along the longitudinal axis into contact with the ratchet wheel contact surface.

6. The disc brake of claim 2, wherein
the pawl tooth is arranged on the pawl such that the pawl tooth does not engage the ratchet wheel tooth during rotation of the rotary lever in the brake application direction until the rotary lever rotates a predetermined amount corresponding to a predetermined amount of brake pad wear at which wear adjustment is to be performed.

7. The disc brake of claim 1, wherein
the tappet is supported on the bridge in a non-rotational manner.

8. The disc brake of claim 7, wherein
an anti-rotation surface of the tappet is configured to engage a corresponding anti-rotation surface of the bridge when the tappet is in an installed position on the bridge.

9. The disc brake of claim 8, wherein
the tappet is located in a bore in the bridge parallel to the brake disc rotation axis, and
the tappet anti-rotation surface includes an external flat surface configured to engage an internal flat surface of the bore in the bridge.

10. The disc brake of claim 9, wherein
the bridge is formed from at least two bridge portions, and
at least one of the at least two bridge portions includes the internal flat surface.

11. The disc brake of claim 2, wherein
a first portion of the pawl spring directly or indirectly cooperates with the pawl to bias the pawl in the direction of the rotary lever, and
a second portion of the pawl spring directly or indirectly cooperates with the bridge, such that the second end of the pawl spring moves with the bridge when the bridge is displaced relative to the brake disc.

12. A wear adjuster for a rotary lever disc brake, comprising:
a shaft configured to be supported on a bridge of the disc brake;
a ratchet wheel non-rotatably arranged on a portion of the shaft in a central region of the bridge when the shaft is installed on the bridge,
a pawl configured to be driven by a rotary lever of the disc brake toward the brake disc, the pawl having a tooth configured to engage a tooth of the ratchet wheel; and
a pawl spring arranged to bias the pawl toward a brake disc side of the rotary lever,
wherein
the shaft is configured to rotate a tappet wheel rotatably arranged on a tappet supported on the bridge of the disc brake such that rotation of the shaft in a wear adjustment direction advances tappet relative to the bridge toward a brake disc of the disc brake, and
the pawl tooth is configured to engage the ratchet wheel tooth and to rotate the ratchet wheel and the shaft in the wear adjustment direction, and
when the pawl spring displaces the pawl in a brake release direction after the pawl tooth has engaged the ratchet wheel tooth, the ratchet wheel and shaft rotate in the wear adjustment direction.

13. The wear adjuster of claim 12, wherein
the shaft includes gear teeth configured to drive corresponding gear teeth of the tappet wheel to rotate the tappet wheel about the tappet.

14. A method of compensating brake pad wear in a disc brake, the disc brake having a brake caliper straddling a brake disc, the brake caliper including a rotary lever, a bridge drivable by the rotary lever toward the brake disc, a tappet non-rotatably supported on the bridge, and a wear adjuster, the wear adjuster including a tappet wheel having internal threads engaged with external threads on the tappet, a shaft supported on the bridge and arranged to rotate the tappet wheel, a ratchet wheel non-rotatably arranged on the shaft, and a pawl having a pawl tooth configured to engage a tooth of the ratchet wheel, comprising the acts of:
rotating the rotary lever in a brake application direction to advance the bridge and the tappet toward the brake disc and to displace the pawl at least until the pawl tooth engages the ratchet wheel tooth; and
rotating the rotary lever in a brake release direction after the pawl tooth engages the ratchet wheel tooth to withdraw the bridge from the brake disc and to advance the tappet relative to the bridge toward the brake disc by the pawl tooth driving rotation of the ratchet wheel, the shaft, and the tappet wheel in a wear adjustment direction.

15. The method of claim 14, wherein
a first portion of the pawl is biased against a brake disc-side face of the rotary lever by a spring arranged between a second portion of the pawl and the bridge.

16. The method of claim 15, wherein
the bridge includes a ratchet wheel aperture configured to receive at least a portion of the ratchet wheel when the shaft is in an installed position on the bridge.

17. The method of claim 16, wherein
the ratchet wheel aperture has a width parallel to a longitudinal axis of the shaft wider than a width of the ratchet wheel along the shaft longitudinal axis, and
during the act of rotating the rotary lever in a brake application direction, the ratchet wheel is biased by the shaft in a direction parallel to the longitudinal axis against a ratchet wheel contact surface of the aperture configured to inhibit rotation of the ratchet wheel.

18. The method of claim 14, wherein
the shaft includes gear teeth configured to drive corresponding gear teeth of the tappet wheel to rotate the tappet wheel to advance the tappet relative to the bridge during the act of rotating the rotary lever in a brake release direction.

19. The method of claim 14, wherein
the pawl tooth is arranged on the pawl such that during act of rotating the rotary lever in the brake application direction, the pawl tooth does not rotate the ratchet wheel tooth until the rotary lever rotates a predetermined amount corresponding to a predetermined amount of brake pad wear at which wear adjustment is to be performed.

* * * * *